Dec. 10, 1940. W. E. HASELWOOD 2,224,389
FISHING LURE
Filed May 5, 1938
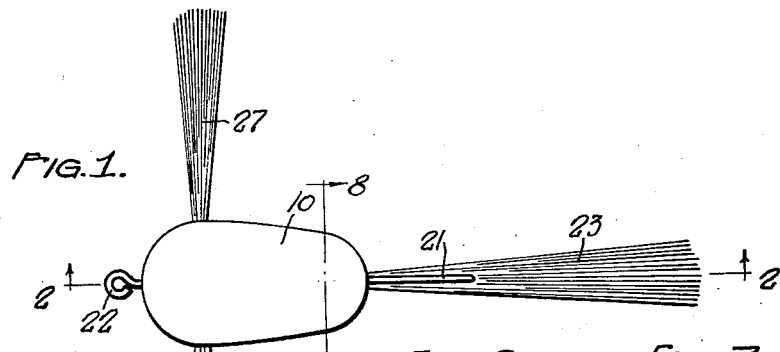
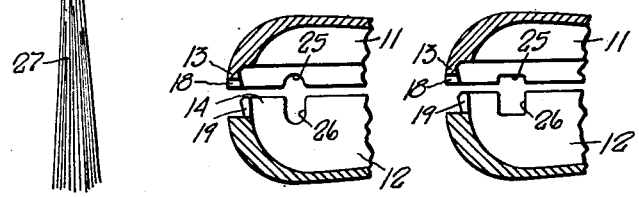
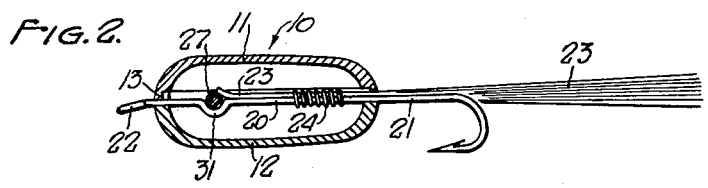
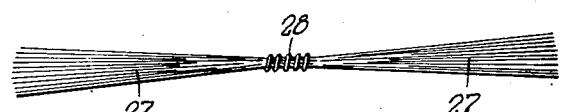
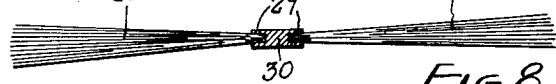
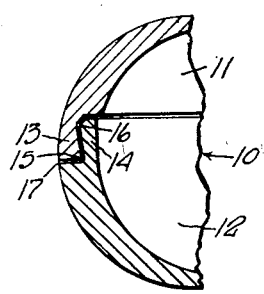
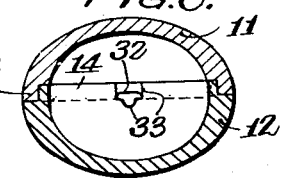
INVENTOR.
WILLIS E. HASELWOOD.
BY Oltsch & Knoblock
ATTORNEYS Patented Dec. 10, 1940

2,224,389

UNITED STATES PATENT OFFICE 2,224,389

FISHING LURE

Willis E. Haselwood, Elkhart, Ind.

Application May 5, 1938, Serial No. 206,123

11 Claims. (Cl. 43—48)

This invention relates to improvements in fishing lures, and particularly to small light weight lures for use with a fly rod.

Heretofore small fishing lure of the fly type have been made largely of hair, hackle, feathers or the like, and where a definite body portion is included therein, the same has been formed either by closely packing the hair, etc., on a hook and trimming it to shape, or by using cork or other suitable material as a body. Lures of this type are largely made by hand and are hence expensive to manufacture, and lack uniformity and other desired characteristics.

It is the primary object of this invention to provide a lure of this type having a hollow body formed of complementary cup-shaped molded sections having a hook shank and suitable appendages of hair, hackles, feathers or the like clamped between the sections in desired relation to the body.

A further object is to provide a lure formed of complementary cup-shaped molded parts having interfitting resilient flanges adapted to facilitate rapid and accurate assembly.

A further object is to provide a lure formed of complementary molded parts having interfitting marginal flanges provided with registering openings through which hair or like appendages project, the shape of said openings determining the arrangement of said appendages.

A further object is to provide a lure of this character having a sectional body through which a hook and wings extend in angular relation, said hook and wings being interconnected at the interior of the body to hold said parts in desired relation.

A further object is to provide a lure which is comparatively inexpensive to manufacture, and is simple and susceptible for rapid assembly.

Other objects will be apparent from the specification and appended claims.

In the drawing:

Fig. 1 is a top plan view of the lure.

Fig. 2 is a longitudinal vertical sectional view taken on line 2—2 of Fig. 1.

Fig. 3 is a plan view of the wing assembly.

Fig. 4 is a sectional view of a modified wing assembly.

Fig. 5 is an enlarged fragmentary vertical sectional view of the lure body.

Fig. 6 is a fragmentary vertical sectional view taken on line 2—2 of Fig. 1 and illustrating the body sections in registering but separated relation with one form of flange opening for the wings.

Fig. 7 is a sectional view similar to Fig. 6 and illustrating another form of flange opening for the wings.

Fig. 8 is a transverse sectional view, along the line 8—8 of Fig. 1.

Referring to the drawing, the numeral 10 designates a body which may be of any desired size and shape. Body 10 is preferably formed of plastic material such as cellulose acetate, cellulose nitrate or any other suitable moldable material which is insoluble in water. Body 10 is formed of two complementary substantially cup-shaped parts, 11 designating the upper part and 12 designating the lower part. The body parts are preferably interconnected at their margins in a horizontal plane.

The body parts 11 and 12 are preferably of greater wall thickness adjacent their marginal edges than at the center, and are provided with interfitting marginal flanges 13 and 14, respectively, as best illustrated in Fig. 5. The flanges are of reduced thickness as compared to the adjacent wall thickness of the body, the flange 13 forming a continuation of the outer contour of body portion 11 and being of greater thickness at its outer edge than at the point of juncture with said body. The flange 14 is inset from the outer contour of member 12 and is likewise of greater thickness at its outer edge than at the point of juncture with said body. The flange 13 is of slightly smaller perimetral dimension at the inner perimetral shoulder 15 thereof than the perimetral dimension of the outer perimetral shoulder 16 of flange 14, so that the interfitting faces between shoulders 15 and 16 are slightly inclined from the perpendicular with respect to the parting plane of the body sections. This, taken with the thin section of said flanges and the elasticity inherent in the body material, provides a snap locking fit between the flanges which serves to hold the parts together for purposes to be hereinafter more fully explained. The parts are so formed that the seam between the interfitting flanges appearing at the outer surface of the body at 17 is substantially centrally thereof to facilitate molding.

At the front of the body, the flanges 13 and 14 are provided with complementary transverse edge recesses 18 and 19. The recess 18 in flange 13 is preferably shallow, and the recess 19 in flange 14 is comparatively deep, as illustrated in Figs. 6 and 7, in order that they may form a cylindrical passage through the body wall which closely fits around the shank 20 of a hook 21 in rearwardly spaced relation to the line attaching eyelet 22 of said hook. Similar complementary recesses are formed in flanges 13 and 14 at the rear end of the body to accommodate passage of the hook shank therethrough, though said recesses are slightly larger than recesses 18 and 19 whereby a bunch of hair, hackle or feathers 23 which forms a tail and is tied to the hook shank 20 at 24 may also pass outwardly through the body wall.

Complementary pairs of recesses 25 and 26 are formed in opposed relation at the sides of the body 10 in the edges of flanges 13 and 14, respectively. These recesses may be of any desired configuration, two forms being illustrated in Figs. 6 and 7; and they accommodate passage through the body of the laterally extending wings 27 which are preferably formed of bunches of elongated hair or the like. It will be observed that the shape of the wings 27 will be determined in part by the shape of recesses 25 and 26, that illustrated in Fig. 6 providing a cylindrical opening through the body wall and hence substantially cylindrical arrangement of the wings, and that illustrated in Fig. 7 providing a narrow elongated opening through the body wall, and hence a thin wide arrangement for the wings. The wings 27 are preferably of unitary construction. One form thereof is illustrated in Fig. 3 wherein the wings are formed of a single bunch of hair tied at 28 at its center. A second form of the wing unit is illustrated in Fig. 4 wherein the inner ends of two bunches of shorter hairs are suitably gripped, clamped or secured in cupped or recessed ends 29 of a member 30. The shank 20 of hook 21 is provided with a bent off-set portion 31 in substantial alignment with the opposite pairs of recesses 25, 26 to receive the center portion of the wing unit to permit the wings to extend laterally in the plane of seam 17 at right angles to the hook shank; though it will be understood that this wing receiving portion 31 may be located in any desired relation to said recesses for the purpose of determining the position of said wings with relation to the body.

In manufacture, the tail 23 is tied to the hook shank 20 adjacent off-set 31 thereof, and the assembled wing unit is secured to the hook shank at off-set 31 in any suitable manner, as by tying or cementing. If desired the inner end of tail 23 may also be secured to the wing unit. This assembly of hook, tail and wings is then applied to the bottom part 12 of the body with the hook shank seating in recesses 19 at the front and rear thereof, and wings 27 seated in recesses 26. The top part of the body is then pressed on the bottom part with flanges 13 and 14 thereof interlocking with a resilient snap locked fit. It will be obvious that the various recesses in said flanges increase the resilience of said flanges to accommodate said snap lock. The parts are then locked in operative relation, with the recesses 25, 26 shaping wings 27 as desired incident to the locking of the body parts in proper relation. The tail 23 may obviously be shaped in the same manner by the contour of the flange recesses 32, 33 (Fig. 8) through which it passes. The snap interlock of the body parts serves to hold the assembled parts in proper relation whereby the same may be readily handled, and reduces the time and labor necessary for the assembly operation. To complete the lure, the parts thereof are cemented at seam 17 and at each pair of flange recesses, whereby the body is rendered watertight and hence buoyant. The cement may be applied before the body parts are snapped together, or after the complete assembly, in either event the resilient flange interlock holds the parts until the cement has fully set.

It will thus be seen that the construction is very simple, requires a minimum amount of time for assembly, is well adapted to quantity production without requiring tools, jigs or fixtures for assembly, forms an attractive and effective lure, and is of entirely sealed character which provides and maintains any degree of buoyance desired.

I claim:

1. A fishing lure comprising a hollow body formed of complementary sections having interlocking marginal flanges, at least one flange having an edge recess to form an opening at the parting plane of the body, and a member carried by said body and passing through said opening.

2. A fishing lure comprising a hollow body formed of complementary sections having registering recesses to form a plurality of openings in said body at the parting plane thereof, a hook extending through said body at two of said openings to project from said body at its ends, said hook having an off-set interiorly of said body, and a wing secured at said hook off-set and projecting from said body through another opening at an angle to said hook.

3. A fishing lure comprising a hollow body formed of complementary sections having marginal interlocking flanges, said flanges having registering recesses forming a plurality of body openings, a hook having a shank provided with an off-set, a wing member secured at its center to said off-set, the ends of each of said hook and wing member projecting from said body through said openings.

4. A fishing lure comprising a hollow body formed of complementary sections, said body having spaced openings at its parting plane, a hook, a wing unit comprising a bunch of thin flexible elongated members secured at its center to said hook and extending at an angle thereto, and a tail unit comprising a bunch of thin flexible elongated members secured to said hook and extending substantially parallel to said hook, said hook, wing unit and tail unit forming an assembly held by said body and passing through said spaced openings, the members of said wing unit and of said tail unit being arranged in predetermined relation by the shapes of the respective openings through which said units pass.

5. A fishing lure comprising a hollow body formed of complementary sections having interfitting margins, at least one section having an edge recess providing a configured body opening outlined in part by the margin of the other section, and a bunch of thin flexible elongated members interconnected within said body extending through said opening and arranged in predetermined relation by the shape of said opening.

6. A fishing lure comprising a hollow body formed of complementary sections having resilient marginal flanges for interlocking said sections, said flanges having registering configured edge recesses, one of said recesses being of a depth at least equal to the width of its flange, and a bunch of thin flexible elongated members interconnected within said body and seated in said last named recess, said bunch being arranged in predetermined relation by the shape of said recesses when said sections are operatively connected.

7. A fishing lure comprising a hollow body formed of complementary sections having registering marginal recesses forming a configured body opening, a bunch of thin elongated flexible members, and means mounting said bunch in predetermined position within said body, said bunch projecting through said opening and relatively arranged in conformity with the shape of said opening.

8. The construction of claim 7 wherein said bunch is cemented at said opening to seal said body.

9. A fishing lure comprising a hollow body formed of complementary sections having registering marginal recesses forming a configured body opening, a hook, a bunch of thin elongated flexible members secured to said hook and extending parallel thereto, said hook and bunch extending through said opening whereby said opening serves to arrange said bunch in desired relation to said hook exteriorly of said body.

10. A fishing lure comprising a hollow body formed of complementary sections having interfitting marginal flanges, said flanges being resilient and of greater width at their outer portions than at the juncture with said sections, said flanges having interfitting locking faces at an angle to the perpendicular with respect to the parting plane of the body, said sections being cemented together to seal said body, said flanges holding said sections in operative relation while said cement sets.

11. A fishing lure comprising a hook, a wing unit formed of a pair of bunches of elongated flexible members held in substantial alignment by interconnecting means, and a two-part hollow body having openings at its parting plane in which said hook and unit are secured and from which they project, said unit being secured to said hook interiorly of said body to prevent rotation and longitudinal displacement of said hook in said body.

WILLIS E. HASELWOOD.